United States Patent [19]

Riggin

[11] Patent Number: 4,598,925
[45] Date of Patent: Jul. 8, 1986

[54] TRAILER WITH IMPROVED FOLDING GOOSENECK FOR CARRYING

[76] Inventor: Steven R. Riggin, 729 Grapevine Hwy., Suite 321, Hurst, Tex. 76054

[21] Appl. No.: 529,736

[22] Filed: Sep. 6, 1983

[51] Int. Cl.⁴ .............................................. B62D 53/06
[52] U.S. Cl. ............................ 280/425 A; 280/423 B; 414/481; 414/498; 222/610
[58] Field of Search ............... 414/467, 481, 498, 679, 414/641; 298/27, 28; 280/33.99 H, 423 B, 425 A; 222/610

[56] References Cited

U.S. PATENT DOCUMENTS

| | | | |
|---|---|---|---|
| 468,588 | 2/1892 | Westover | 298/27 |
| 1,499,530 | 7/1924 | Henderson | 414/498 |
| 2,878,033 | 3/1959 | Polich | 414/481 X |
| 3,529,739 | 9/1970 | Shafter | 414/641 X |
| 3,659,732 | 5/1972 | Downey | 414/498 X |
| 3,986,726 | 10/1976 | Vos | 280/423 B |
| 3,998,345 | 12/1976 | Fiehler et al. | 414/641 |
| 4,119,328 | 10/1978 | Rhodes | 280/423 B X |
| 4,261,594 | 4/1981 | Corbett et al. | 280/423 B X |
| 4,419,038 | 12/1983 | Pendergraft | 414/467 X |

FOREIGN PATENT DOCUMENTS

| | | | |
|---|---|---|---|
| 2371315 | 7/1978 | France | 414/481 |
| 2091208 | 7/1982 | United Kingdom | 414/679 |

Primary Examiner—Robert J. Spar
Assistant Examiner—Ken Muncy

[57] ABSTRACT

The purpose of this invention is to provide a drawn vehicle that can carry large wheeled vehicles such as combines and hopper botton freight. The trailer would normally be used in over-the-road transport and would be drawn by a large truck or semi-tractor. The front end of the trailer is fitted with a folding gooseneck.

The design of the trailer makes possible efficient loading and unloading of wheeled or tracked vehicles such as combines. The folding gooseneck is opened to permit the vehicle to be loaded and closed for reconnection to the draft vehicle. When the trailer is not being used to carry combines or wheeled vehicles, it can be used to carry grain by placing grain hoppers on the trailer bed.

2 Claims, 9 Drawing Figures

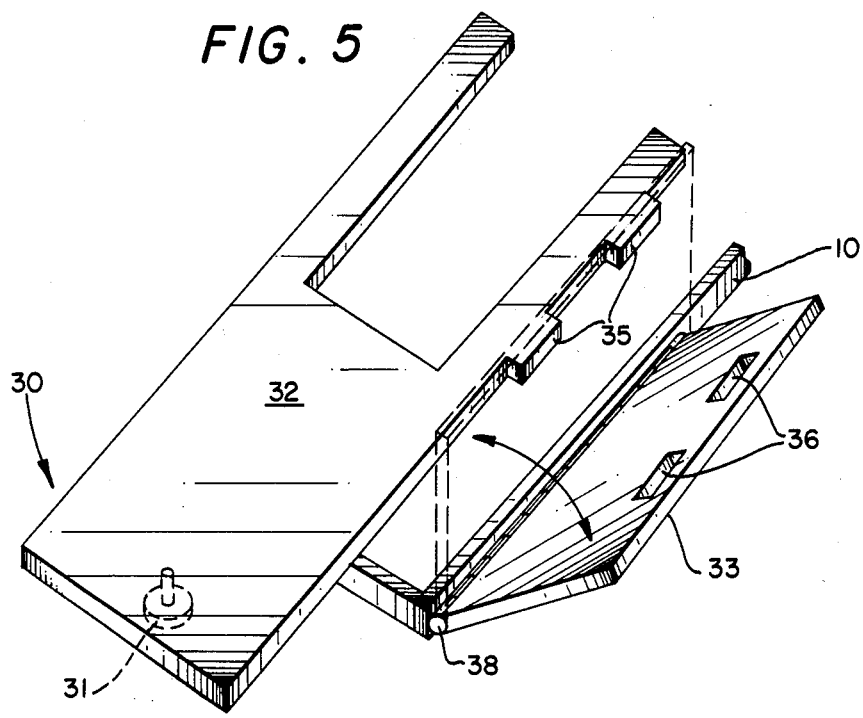
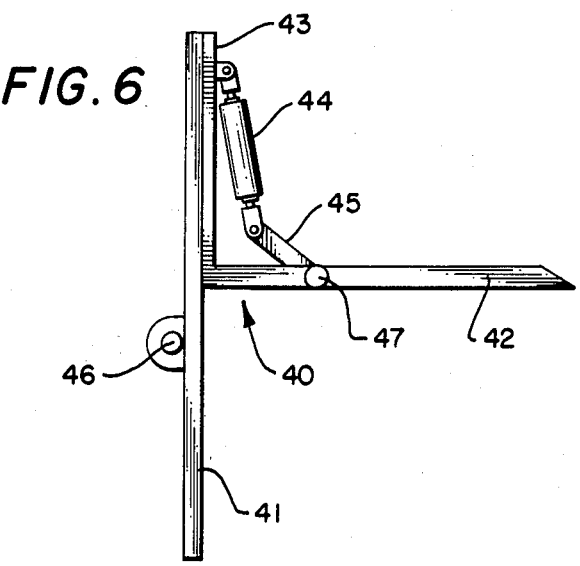
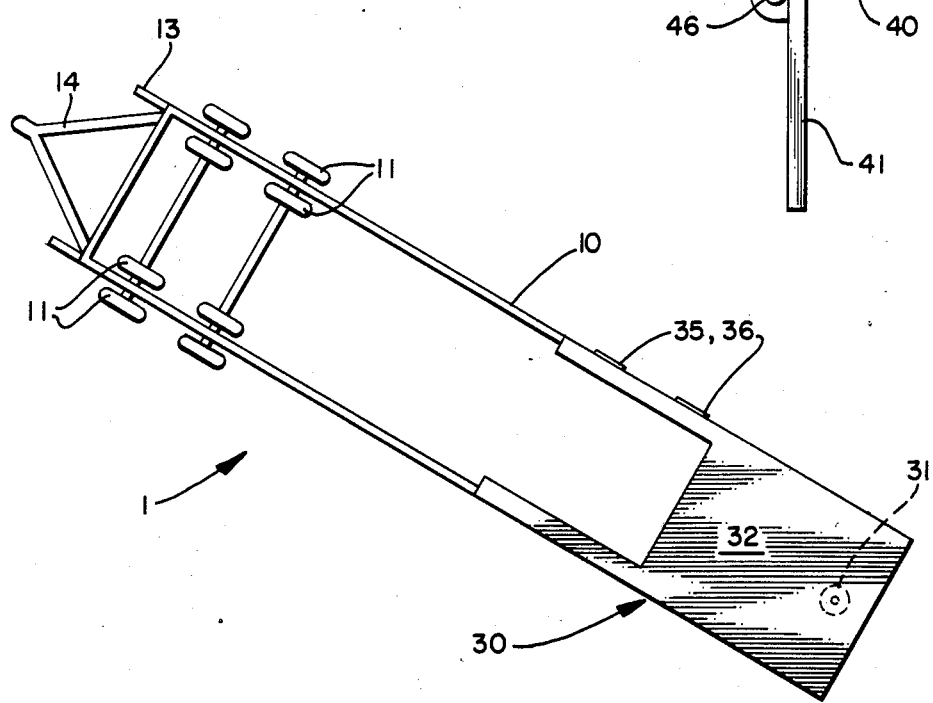

TRAILER WITH IMPROVED FOLDING GOOSENECK FOR CARRYING

BACKGROUND

This invention is directed to a trailer which can be used to load and carry wheeled or tracked vehicles in one mode and then can be converted to carry and dump hopper bottom freight such as grain in a second mode. The trailer would normally be used in over the road transport and would be pulled by a truck, tractor or similar vehicle.

The design of wheeled trailers dates back well over half a century. The use of flat bed and other trailers to transport vehicles is common in commerce. However, there is at present no design commercially available that can be used to carry and efficiently handle both hopper bottom freight and large wheeled vehicles such as combines.

SUMMARY

In order to aid in the understanding of this invention, it can be stated in essentially summary form that the trailer is constructed of a rigid undercarriage with one or more wheeled axles and that grain hoppers can be mounted upon the trailer undercarriage. The grain hoppers of this invention are constructed of a shape that permits them to be inserted into the body of an identical grain hopper. The shape of the grain hoppers which permits them to be sequentially stacked makes it possible to carry many grain hoppers in a volume of space not substantially greater than a single grain hopper. A means for dumping hopper bottom freight such as soybeans, corn, wheat, etc., is provided in the bottom of each grain hopper.

The trailer may be drawn by a semi-tractor with a fifth wheel coupling mechanism. The king pin on the folding gooseneck mechanism will be connected to the fifth wheel of the semi-tractor. In the preferred embodiment, the folding gooseneck will be rotationally hinged to the sides of the trailer. The members of the folding gooseneck which are in the verticle position during over the road operation are rotated approximately 90 degrees to a horizontal position to function as loading ramps.

A means for mounting, removing, sequentially stacking, and loading the grain hoppers is necessary. In the preferred embodiment, this sequential stacking apparatus will be constructed so as to permit mounting on the wheeled or tracked vehicle being carried on the trailer.

The wheeled or tracked vehicles are loaded by driving them onto the trailer with the vehicle approaching from the front end and traveling astraddle of the trailer undercarriage until it approaches the rear axle. After the vehicle is loaded onto the trailer a stack of grain hoppers can be placed on the trailer undercarriage at or near its front end.

BRIEF DESCRIPTION OF THE DRAWINGS

FIG. 5 is a oblique view of the folding gooseneck approaching the closed position.

FIG. 6 is a side view of the grain hopper lifting apparatus.

FIG. 7 is a top plan view of the trailer without grain hoppers.

The preferred embodiment contemplated by the inventor would be a trailer with a folding gooseneck carrying a single harvesting machine (combine). The trailer would be drawn by a semi-tractor with a fifth-wheel to connect to the king pin of the folding gooseneck.

In the best mode contemplated by the inventor, the trailer would be uncoupled from the draft vehicle and the combine or other land vehicle would be loaded and unloaded from the front of the trailer. The two rotationally hinged members of the folding gooseneck would be opened to permit loading and unloading of the land vehicle. The two rotational hinged members would then be closed and locked together by means of interlocking male and female coupling elements to permit reconnection to the draft vehicle.

When the trailer was not being used to haul land vehicles, it could be converted to haul hopper bottom freight (grain). In the best mode contemplated by the inventor, two grain hoppers would be mounted on the trailer. They would be of a shape so that one grain hopper could be nested inside of a second grain hopper when not being used to carry grain.

In the preferred embodiment, the grain hoppers would have horizontally mounted hollow tubes fastened to the upper edge of two opposite sides to permit the hoppers to be lifted by a grain hopper lifting apparatus. To lift and carry the hoppers, the grain hopper lifting apparatus would be mounted on the front of the combine.

DESCRIPTION

Figure 1:
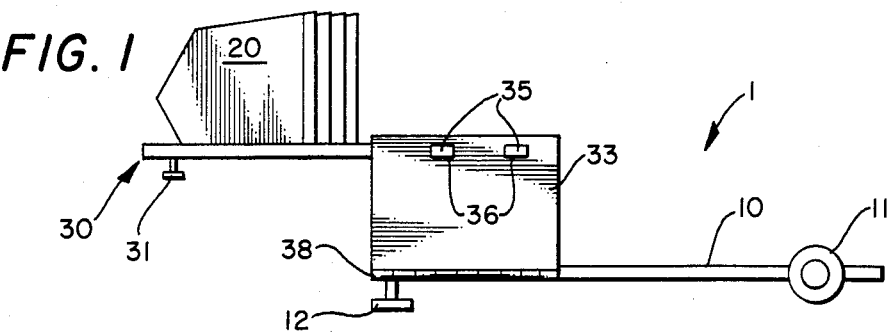
FIG. 1 is a side view of the single axle trailer with grain hoppers carried on folding gooseneck.
Figure 2:
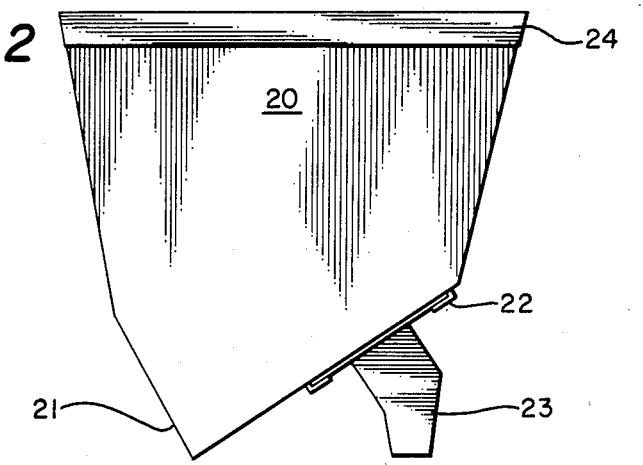
FIG. 2 is a side view of the grain hopper.
Figure 3:
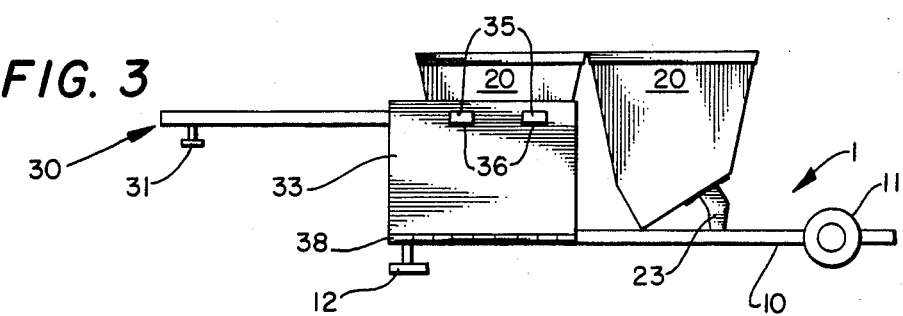
FIG. 3 is a side view of a single axle trailer in the hopper bottom freight mode.
Figure 4:
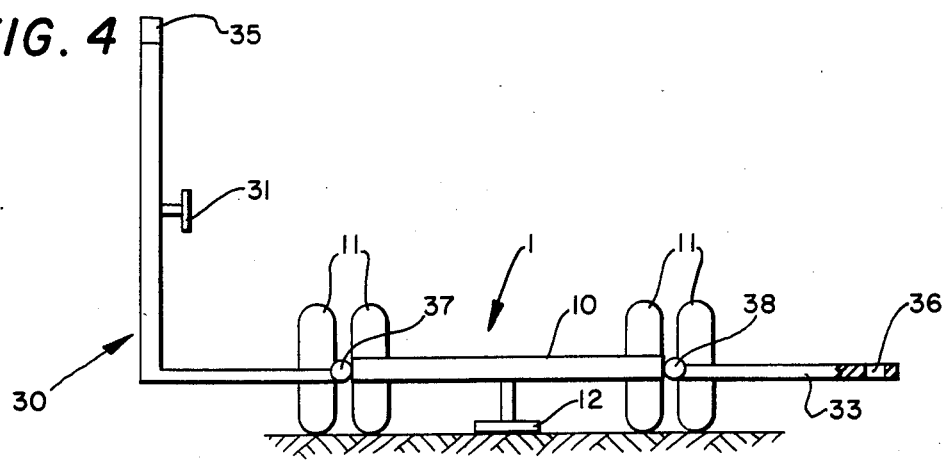
FIG. 4 is a front end view of the folding gooseneck which is open to facilitate loading of the tracked vehicle.
Figure 8:
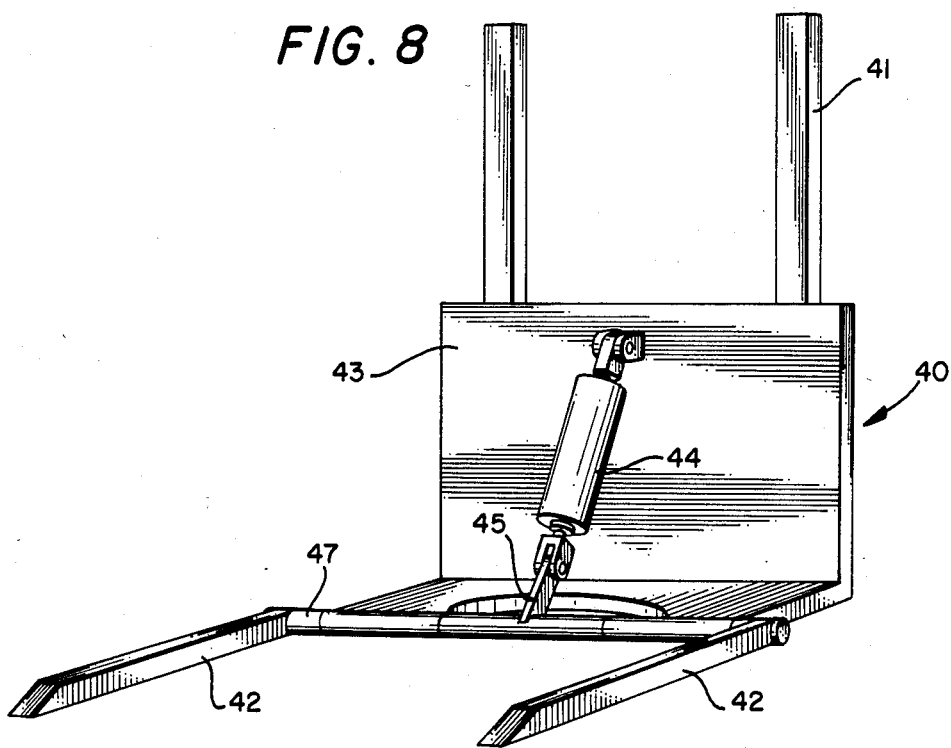
FIG. 8 is a front oblique view of the grain hopper lifting apparatus.

The convertible trailer of this invention is generally indicated at 1 in both FIGS. 1 and 7. The trailer indicated in FIG. 1 has a folding gooseneck indicated at 30. The principal elements which form the trailer structure are trailer body 10 transverse cross member 18, wheeled axle 11, and trailer dolly 12. In order for the trailer to haul grain at least one grain hopper 20 must be mounted on the trailer body. In the preferred embodiment, two grain hoppers would be mounted on the trailer as shown in FIG. 3. Grain can be gravity dumped by using the grain hopper door 21. If the trailer is to be drawn by a semi-tractor, it will have a folding gooseneck 30 as shown in FIG. 1. The king pin 31 will fit into the fifth wheel of the semi-tractor. The folding gooseneck 30 will open as shown in FIG. 4. Right angle member 32 will be rotated around rotational hinge 37. Locking member 33 will be rotated around rotational hinge 38. Once the folding gooseneck 30 is opened, wheeled or tracked vehicles can be driven onto the trailer body 10.

Figure 9:
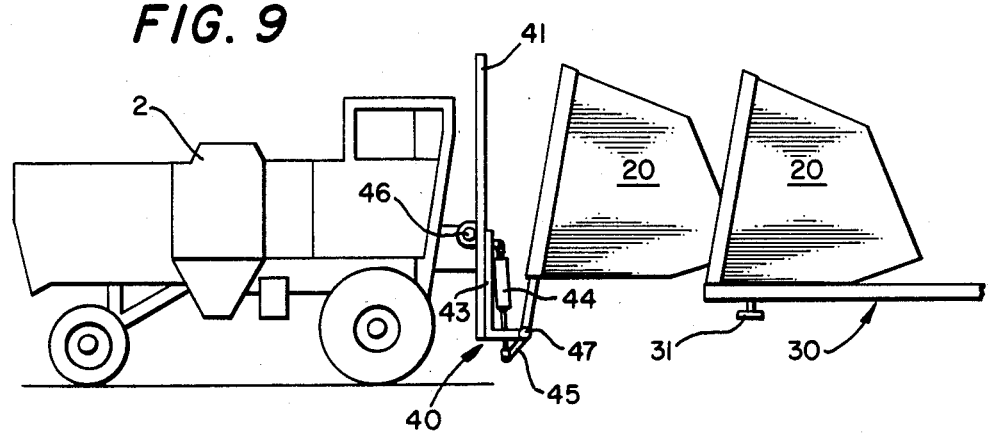
FIG. 9 is a side view of the grain hoppers being horizontally stacked using the lifting apparatus mounted on a powered vehicle.

Once the folding gooseneck 30 is closed, a grain hopper 20 can be placed upon the right angle member 32. Additional grain hoppers 20 can be nested inside the first grain hopper placed upon the right angle member as shown in FIG. 9.

In order for the grain hopper 20 to be horizontally nested inside of a second grain hopper 20 the grain hopper lifting apparatus 40 is mounted to a harvesting machine 2 by the use of lifting apparatus mounting brackets 46.

A grain hopper 20 placed on the ground can be lifted by driving the harvesting machine 2 so that the lifting arms 42 are inserted into the grain hoppers hollow lifting tubes 24. The grain hopper 20 can be lifted by powered means that will cause the lifting platform 43 to move vertically upward along the rigid telescopic member 41. Once the grain hopper 20 is at the desired height it can be rotated from a vertical disposed position to a horizontal disposed position.

The rotation of the grain hopper is accomplished by powered extension of the arm rotating cylinder 44. In the preferred embodiment hydraulic power would be sent from the harvesting machine 2 to provide power for lifting and rotating with the grain hopper lifting apparatus 40. The powered extension of the arm rotating cylinder 44 causes the lifting arm crankshaft 45 to rotate downward and the lifting arms 42 to rotate upward thereby bringing the grain hopper 20 to a horizontally disposed position as shown in FIG. 9.

When a wheeled or tracked vehicle has been loaded, the folding gooseneck 30 can be closed as shown in FIG. 5. The sections 35 on right angle member 32 are driven into holes 36 on locking member 33.

Once the folding gooseneck 30 is closed, a grain hopper 20 can be placed upon rotational platform 39 on swivel table 34. Additional grain hoppers 20 can be sequentially stacked using the grain hopper lifting apparatus 40 shown in FIG. 6. Once the stacking operation is complete, the grain hoppers 20 can be moved rotationally using the swivel table 34. The grain hoppers 20 can be moved horizontally as well, sliding swivel table 34 along rollers 50. When the grain hoppers 20 are in the position as shown in FIG. 1, they act as an air deflector that reduces the amount of power necessary to pull the trailer 1. Once the grain hoppers are in position, the trailer 1 can be lifted using the dollies 12.

Where the draft vehicle is a large truck, the trailer would be as shown in FIG. 7. The rear end of the trailer 10 would be lifted with an upward swinging draft hitch 14 and the front end of the trailer 10 would be fitted with an upward swinging draft hitch 15. Either of the draft hitches 14 or 15 could be used to extend the length of the trailer 10 to accommodate different loads. The rear end of the trailer 10 is fitted with a fixture 13 for holding the grain hopper lifting apparatus 30.

This invention having been described here in its preferred embodiment, it is clear that it is susceptible to numerous modifications and embodiments within the ability of those skilled in the art without the exercise of the inventive faculty. Accordingly, the scope of this invention is defined by the scope of the following claims.

I claim:

1. In a drawn vehicle having a rectangular horizontally disposed rigid chassis including:
    (i) longitudinal chassis members, and
    (ii) transverse chassis members, and
    (iii) a plurality of ground engaging wheels
    a folding gooseneck means connected to the chassis for connecting said drawn vehicle to a draft vehicle the improved structure for folding gooseneck comprising in combination with the above:
   two independent rigid gooseneck members each having
    (i) an edge rotationally hinged to the chassis wherein rotational movement is possible around an axis parallel to the longitudinal axis of said drawn vehicle
    (ii) a longitudinal member with coupling means to afford rigid attachment to opposite gooseneck member.

2. The drawn vehicle of claim 1 with the additional limitations of
    (i) one of said rigid gooseneck members having at least one female coupling means
    (ii) one of said rigid gooseneck members having at least one male coupling means to afford rigid attachment to opposite gooseneck member having female coupling means.

* * * * *